Patented June 5, 1934

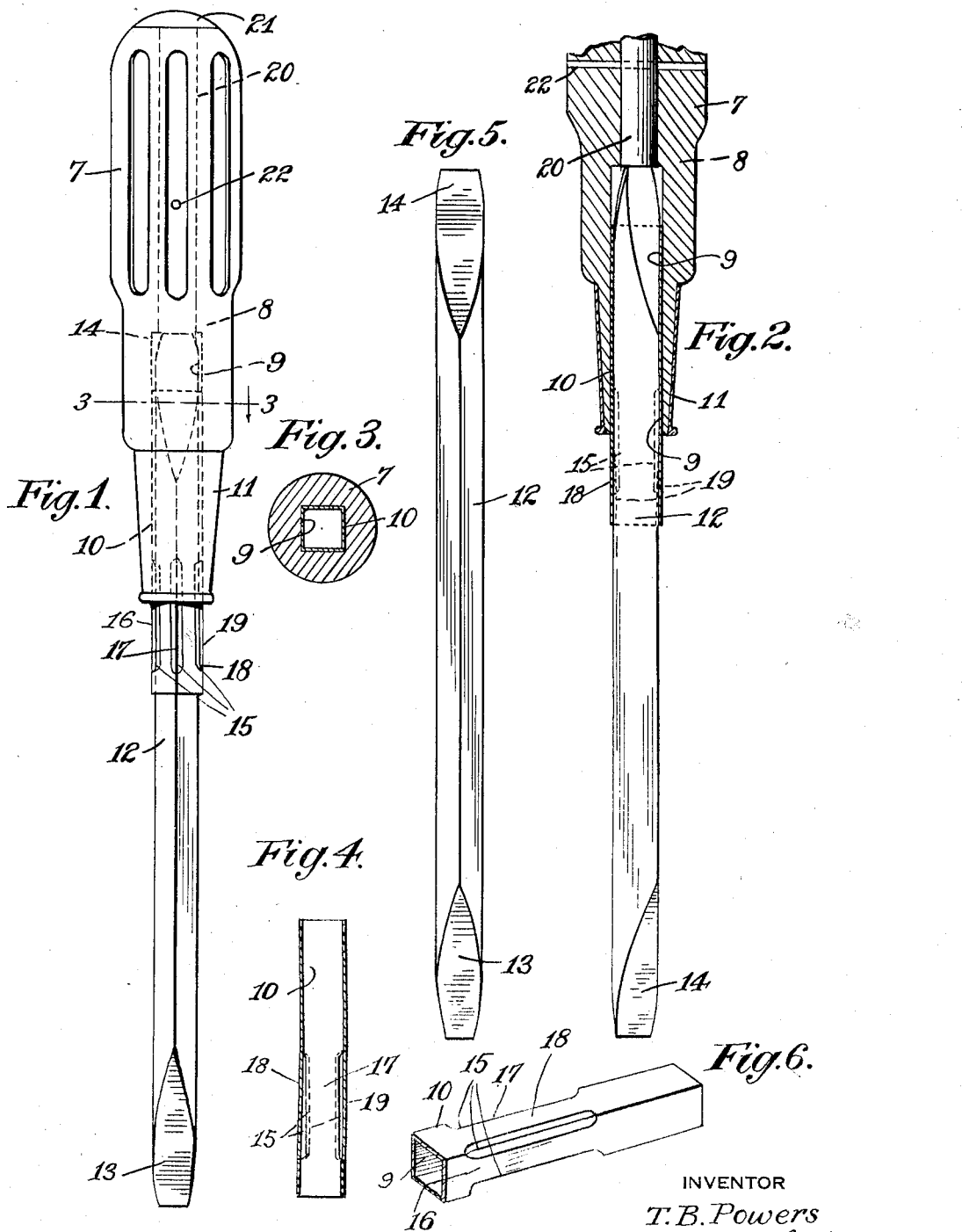

1,961,246

UNITED STATES PATENT OFFICE 1,961,246

SCREW DRIVER

Timothy B. Powers, St. George, Staten Island, N. Y.

Application April 29, 1932, Serial No. 608,183

1 Claim. (Cl. 279—102)

This invention relates to tools used by mechanics, and particularly to a screw driver; and has for its object to provide a screw driver with a pair of blades mounted on the opposite ends of a detachable shank or bit, and wherein the shank normally retained in the handle can be readily withdrawn by exerting considerable pressure or strain, and the shank reversed, so that the end that was in the handle can be used on the screw, and the other end portion or half of the shank is simply inserted in the handle, to be retained therein; and which shank will preferably have the two screw-engaging ends of different sizes, to facilitate use on screws or slotted bolts of different sizes.

A further object of the invention is to provide in such a structure, means for frictionally retaining the shank in the handle on insertion, to permit its easy withdrawal when desired, at the same time the shank will be rigidly and strongly supported in the handle to prevent lateral or twisting movement therein.

Another object of the invention is to provide means in the handle for rigidly engaging the end of the shank that is inserted in the handle, so that should a blow be received on the upper end of the handle it will be transmitted to the shank.

In the accompanying drawing showing one embodiment of my invention,

Fig. 1 is a side elevation of the device with the interior parts indicated with broken lines.

Fig. 2 is a partial section.

Fig. 3 is a cross section on the line 3—3 of Fig. 1.

Fig. 4 shows the socket tube in the handle for the shank.

Fig. 5 shows the shank detached.

Fig. 6 indicates the handle tube.

As shown in the drawing I provide a handle 7 of suitable material such as wood, the lower portion of the handle from the point 8 downwardly being provided with a bore 9 of polygonal cross section, adapted to receive a tube 10 of similar polygonal cross section, the latter being shown as square, in which case the bore 9 in the handle will also be square. The tube is preferably a driving fit in the handle bore. If desired the outer end of the handle at this portion can be reinforced by a ferrule 11 of the usual tapered form.

The shank or bit 12 is of such form to have a sliding fit in the tube 10, and hence in this case will be also square, and of uniform size or cross section from end to end, except at the end portions. The latter are shown as flattened or of wedge shape as at 13 and 14. These may be identical, but are preferably of different size or width, the blade 14 being somewhat wider than the blade 13, to engage different size screw heads.

Means are also preferably provided to assist in retaining the shank when inserted in the tube in the handle as indicated in Figs. 1 and 2, in this position. As shown I provide friction means in one or several walls of the tube 10, in the nature of a spring tongue, that will extend slightly inwards to engage the side walls of the shank and hold the shank in the socket, yet permit its ready withdrawal when desired. As shown at each of the four edges of the tube 10 I make a cut at an angle of 45 degrees as at 15, 15, thus forming four tongues 16, 17, 18, 19, between these slots, and each tongue portion is sprung inwardly a short distance, as indicated in Fig. 4 by slight extension of the metal at this portion. It will be understood that when the shank is inserted it will strike these opposite tongues and will force them outwardly under tension this tending to hold the shank in the tube.

I further provide a stop to engage the inner end of the shank when inserted, and as shown a rod 20 with a head 21 is inserted in a bore in the upper end of the handle, and secured therein as by a pin 22. The lower end of this bar is opposite the inner end of the tube 9, and when the shank is inserted the extremity will strike the end wall of this bar and limit its movement into the socket of the handle. Should a blow be delivered on the upper end of the handle, it will be received by this bar head, and delivered directly to the shank across the end of the blade, and imparted directly to the screw or bolt, without any strain or injury to the handle or other parts of the device.

It will be understood that the device is comparatively simple and of few parts, comprising merely a handle of wood or other material with a square bore in its lower portion, that receives a square tube, and the latter has merely several slots to provide tongues; the shank is merely a square bar with flattened ends to engage the screw, and which ends may be the same or of different widths; and the upper end of the handle has a rod with a head secured in a round bore in the handle. The shank will be securely held in the socket in any normal use, but when it is desired to use the other end of the shank it is merely pulled out and reversed in the socket of the handle.

What I claim is:—

In a tool, a handle, a tool having flat sides of polygonal cross section, and a tubular socket carried by the handle and extending some distance outside of the handle, said socket tube at an intermediate portion having all the flat walls free and spaced apart at the meeting edges of such walls, to form spring tongues that are extended a slight distance inward to each frictionally engage the flat side walls of the shank to removably retain the shank in the handle and prevent its turning in the handle.

TIMOTHY B. POWERS.